Dec. 31, 1935.  L. E. PRYOR  2,025,822
SAFETY DEVICE FOR VEHICLES
Filed May 31, 1935  2 Sheets-Sheet 1
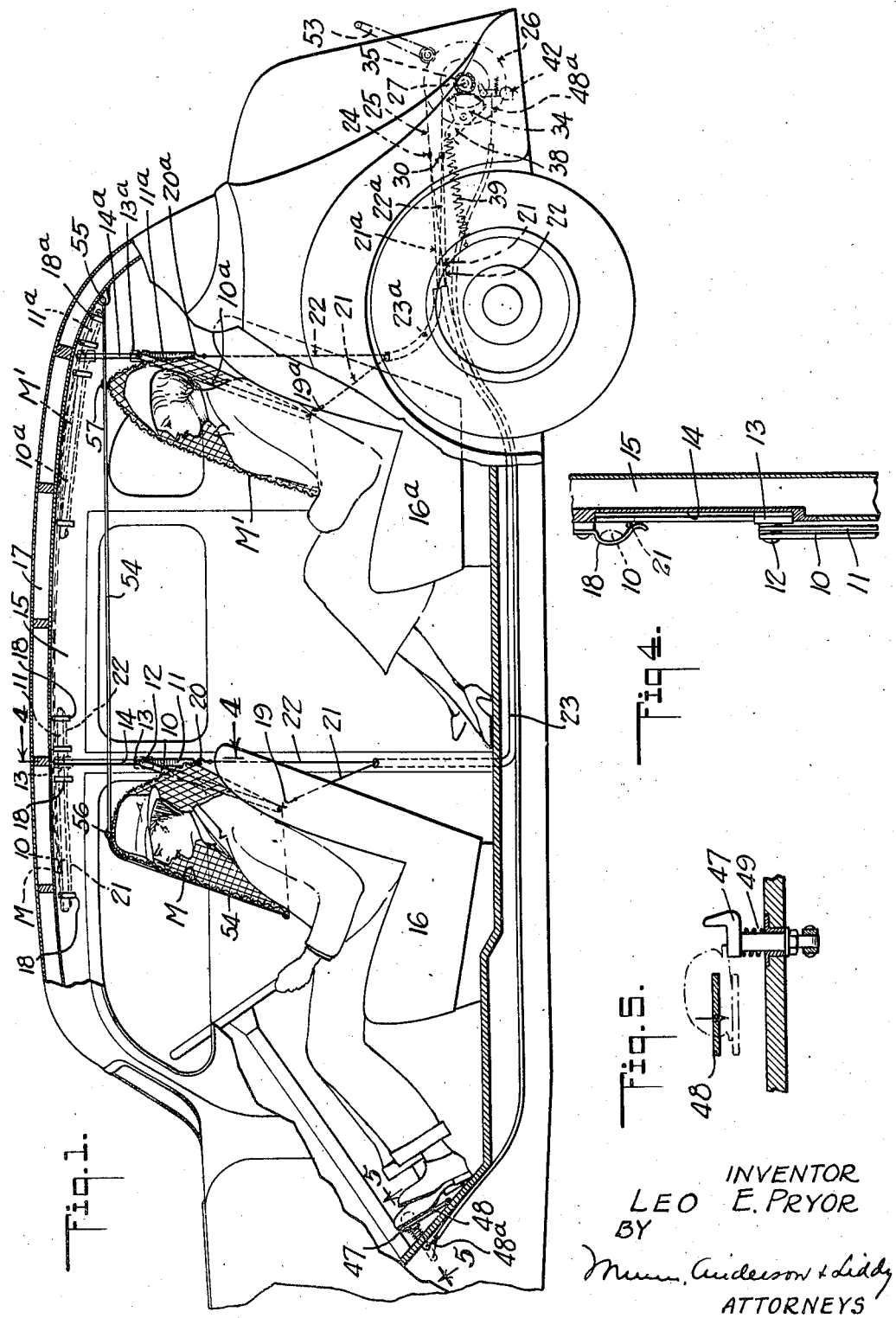
INVENTOR
LEO E. PRYOR
BY
ATTORNEYS Dec. 31, 1935.  L. E. PRYOR  2,025,822
SAFETY DEVICE FOR VEHICLES
Filed May 31, 1935  2 Sheets-Sheet 2
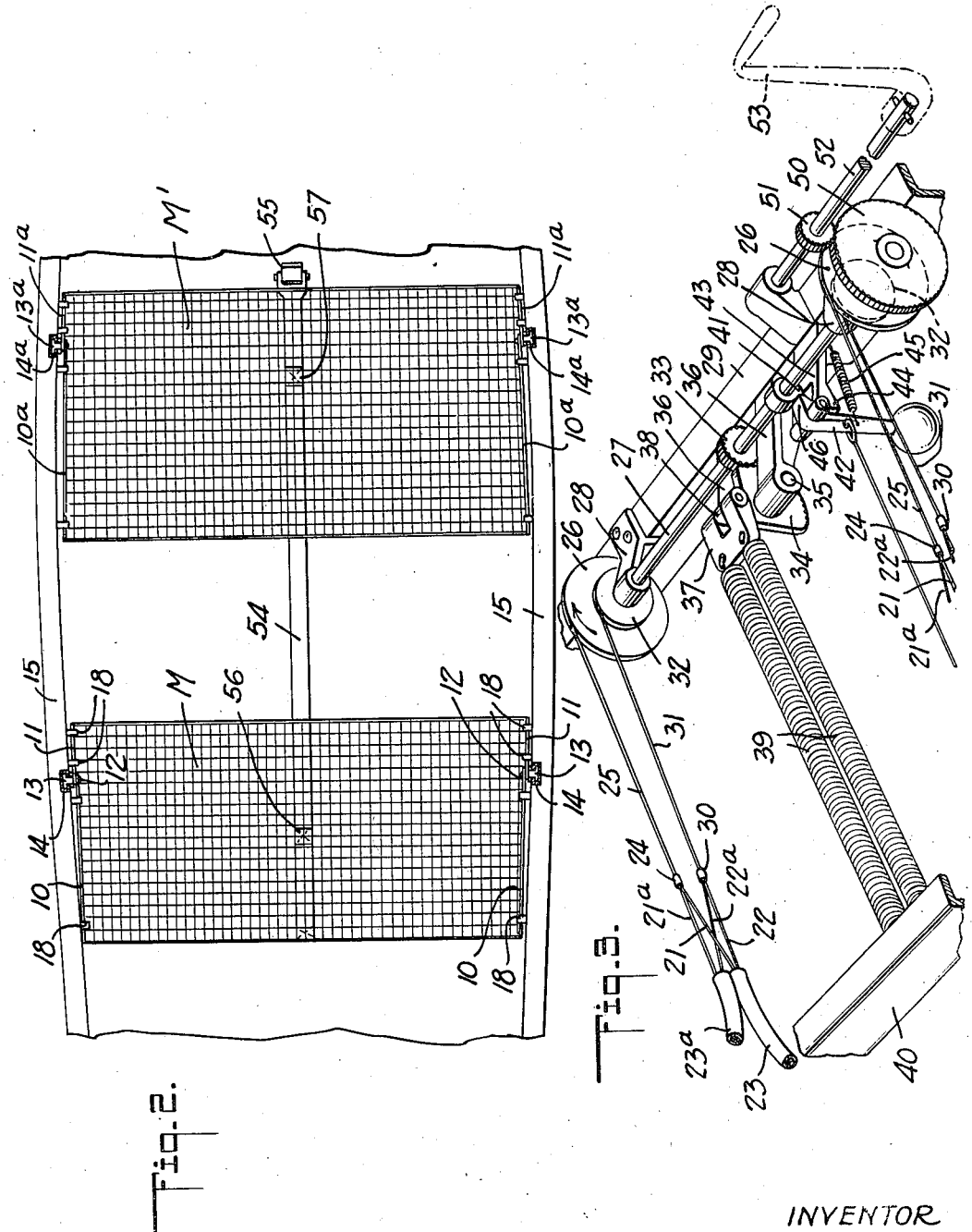
INVENTOR
LEO E. PRYOR
BY
Munn, Anderson & Liddy
ATTORNEYS Patented Dec. 31, 1935

2,025,822

UNITED STATES PATENT OFFICE 2,025,822

SAFETY DEVICE FOR VEHICLES

Leo E. Pryor, Delano, Calif.

Application May 31, 1935, Serial No. 24,444

11 Claims. (Cl. 280—150)

This invention relates generally to vehicles and more particularly to a safety device for use therewith.

An object of the invention is to provide a safety device which embodies means manually or automatically operable to prevent the occupants of a vehicle from being thrown from the vehicle or against walls or surfaces thereof which might cause injury or death to the occupants in the event of a collision or other form of accident involving the vehicle.

Another object of the invention is to provide a safety device which more specifically embodies nets or mantles which are normally arranged folded in an unobstructing and inconspicuous position, but which can be instantaneously actuated to envelop the occupants of the vehicle to such extent and with sufficient security to insure that the occupants will be retained in their seats against the inertia manifesting itself upon the sudden checking of the vehicle's speed or sudden change in its direction of movement resulting from a collision or other form of accident, all to the end of preventing injury to the occupants from contact with some part of the vehicle.

Another object of the invention is to provide a safety device of the above described character which is constructed and arranged to enable the occupants to instantly free themselves from the mantles following operation thereof, so as to prevent the occupants from being imprisoned in the vehicle in the event of fire or other condition necessitating that the occupants immediately vacate the vehicle for safety.

A further object of the invention is to provide a safety device which embodies an actuating mechanism for the mantles capable of being readily set and re-set following actuation of the mantles, and which is both positive and dependable in its operation.

With these and other objects in view, the invention consists in the combinations and arrangements of elements as set forth in the following specification and particularly pointed out in the appended claims.

In the accompanying drawings,

Figure 1 is a view in vertical longitudinal section, showing the safety device embodying this invention incorporated in a vehicle;

Figure 2 is a fragmentary bottom plan view showing the mantles folded;

Figure 3 is a perspective view of the actuating mechanism for the mantles;

Figures 4 and 5 are detail sectional views taken, respectively, on the lines 4—4 and 5—5 of Figure 1.

Referring specifically to the drawings, the invention comprises flexible covering elements such as generally rectangular-shaped front and rear mantles M and M', which are preferably constructed of relatively coarse netting or other suitable material having the requisite strength and flexibility. Secured to the forward corners of the mantle M are rigid arms 10—10, and secured to the rear corners of the mantle are relatively short rigid arms 11—11. The pairs of arms 10—11, 10—11, are respectively pivotally connected at 12—12 to carriages 13—13 reciprocably mounted in vertical guideways 14—14 provided in the side walls 15 of the vehicle approximately in line with the back rest of the front seat 16. The carriages are normally retained in elevated positions, with the arms 10 and 11 disposed horizontally beneath the roof 17 of the vehicle, and with the mantle M arranged substantially flat contiguous to the underside of the roof, all as shown in broken lines in Figure 1. For this purpose, suitable spring clips 18—18—18—18 are secured to the side walls 15 adjacent the roof and are adapted to engage and releasably hold the arms 10 and 11, as shown in Figure 4. As the means for supporting the rear mantle M' are identical to those just described for the front mantle M, the aforestated description will suffice for both. However, in order to distinguish like parts of the two mantle-supporting means from each other, the numerals designating the parts of the rear mantle-supporting means are provided with exponents.

For simultaneously actuating the mantles M and M' to cause them to envelop the occupants of the front and rear seats 16 and 16a as shown in full lines in Figure 1, the following actuating mechanism and control means therefor is provided.

Detachably secured by snap hooks 19—20 to the free ends of the arms 10—10 and 11—11 are flexible cables 21—21 and 22—22, respectively, these cables passing into tubes 23 provided in the side walls of the vehicle body and extending beneath the floor of the latter to points at the rear thereof. Other cables 21a—21a and 22a—22a are detachably secured by snap hooks 19a—20a to the free ends of the arms 10a—10a and 11a—11a respectively, these cables extending through similar tubes 23a. The cables for the arms 10—10a are connected together at 24—24 beyond the rear ends of the respective tubes 23 and 23a to form single cables 25—25 which are trained about pulleys 26—26 fixed to a transverse shaft 27 journaled in bearings 28—28 fixed to a cross member 29 of the chassis frame, all as shown in Figure 3.

The cables for the several arms 11—11a are connected together at 30—30 beyond the rear ends of the respective tubes 23 and 23a to form single cables 31—31 which are trained about pulleys 32—32 also fixed to the shaft 27 alongside the respective pulleys 26—26. Fixed to the shaft 27 medially between the pairs of pulleys is a pinion gear 33 which meshes with a relatively large segmental gear 34 mounted on a shaft 35 disposed parallel to the shaft 27 and journaled in bearings 36 fixed to the cross member 29. Connected by a yoke 37 to a radial arm 38 on the gear 34 are one of the ends of coil springs 39—39, the other ends of which are secured to a second cross member 40 of the chassis frame.

Fixed to the shaft 27 adjacent the gear 33 is a detent 41 which is adapted to co-act with an inertia responsive element comprising a weighted arm 42 rockably mounted in a yoke bearing 43 fixed to the cross member 29 and normally urged against a stop lug 44 by a spring 45 to dispose a detent 46 on the arm for engagement with the detent 41 on the shaft in order to prevent rotation of the shaft in one direction and maintain the actuating mechanism in a set position against the action of the springs 39—39 when loaded.

As the axis about which the weighted arm 42 is mounted to rock is transversely disposed with respect to the length of the vehicle, a sudden checking of forward motion of the vehicle, such as would occur in the event of a collision, will cause the detent 46 of the arm to disengage the detent 41 of the shaft. Connected to the arm 42 and to the spring mounted foot rest 47 for the usual accelerator pedal 48 is a flexible cable 48a which upon depressing the rest 47 against the action of a relatively heavy spring 49, exerts a pull upon the cable to rock the arm 42 and disengage its detent 46 from the shaft detent 41. Thus can the shaft be released automatically by the action of inertia or manually if desired.

Fixed to one end of the shaft 27 is a gear 50 with which constantly meshes a pinion gear 51 to the shaft 52 of which is adapted to be detachably connected the usual crank 53 provided for cranking the engine, all for the purpose of winding the shaft 27 to load the springs 39 and set the actuating mechanism.

The operation of the invention is as follows:

It is to be assumed that the mantles M and M' occupy the folded or inactive positions shown in broken lines in Figure 1, and that the shaft 27 has been wound to place the springs 39 under tension, the shaft being latched against retrograde movement by the co-acting detents 41 and 46. It is to be noted that along with the several arms 10—10a and 11—11a, the cables 21—21a and 22—22a are releasably held against the walls of the vehicle body by the spring clips 18.

Upon disengagement of the detent 46 from the detent 41 either by the action of inertia manifesting itself should the vehicle's speed be suddenly checked, as upon collision with another vehicle, or manually by the operator aware of an impending accident, the loaded springs 39 will instantaneously respond through the gears 34 and 33 to drive the shaft 27 in the direction of the arrows in Figure 3.

Thus the pulleys 26—26 and 32—32 will exert pulls upon the respective cables to cause the latter to co-act with the several supporting arms of the mantles M and M' to draw the mantles over the occupants of the front and rear seats, all as shown in Figure 1. The springs 39 have sufficient strength to securely hold the mantles about the heads and shoulders of the occupants so that the latter will be held in their seats. In order to prevent excessive sagging of the mantles from the lunging strain imposed thereon by the occupants, a flexible strap 54 is permanently secured at one end above the rear windows of the vehicle body as indicated at 55, and is also secured at the points 56 and 57 to the respective mantles M and M' medially between the sides the latter as shown in Figure 2. The free end of the strap is also secured to the mantle M from the point of connection 56 therewith to the forward edge of the mantle, thus reinforcing the mantles and reducing the stresses imposed on the carriages 13—13 and 13a—13a.

It is to be noted that the front mantle M is somewhat shorter than the rear mantle M' and sufficiently so for the operator to have free use of his arms for steering of the vehicle with the mantle applied. Both mantles will yield to an extent enabling the snap hooks 19, 20, 19a, 20a to be unfastened in order that the occupants can free themselves from the mantles.

To reset the actuating mechanism, it is only necessary to rotate the shaft 27 through the medium of the gears 50 and 51 by applying manual turning force to the crank 53, the cables being unwound from the respective pulleys, and the springs being placed under load. One fourth of a revolution of the segmental gear is required to load the springs, the detents 41 and 45 co-acting in the set position of the mechanism shown in Figure 3 to latch the mechanism. The mantles can now be replaced beneath the roof of the vehicle, and suspended by the clips 18, so that the device will be again ready for use.

What is claimed is:

1. A safety device of the class described comprising a flexible covering element; means for mounting the element in a vehicle for movement from a folded position to a position wherein it will envelop the upper portion of a person seated in the vehicle; and means for moving the element to and holding it in enveloping position with sufficient security to prevent the enveloped person from being thrown against parts of the vehicle.

2. A safety device of the class described comprising a flexible covering element; means for mounting the element in a vehicle body for movement from a folded position contiguous to the roof of the body to an enveloping position with respect to the upper portion of a person seated in the vehicle; actuating means for said element tending to move the latter to and maintain it in its enveloping position; means for releasably retaining the actuating means in a set position; and means under the control of an occupant of the vehicle for tripping the retaining means so as to render the actuating means free to move the element as aforestated.

3. A safety device of the class described comprising a flexible covering element; means for mounting the element in a vehicle body for movement from a folded position contiguous to the roof of the body to an enveloping position with respect to the upper portion of a person seated in the vehicle; actuating means for said element tending to move the latter to and maintain it in its enveloping position; means for releasably retaining the actuating means in a set position;

and inertia-responsive means for tripping the retaining means so as to render the actuating means free to move the element as aforestated.

4. A safety device of the class described comprising a flexible covering element; means for mounting the element in a vehicle for movement from a folded position to a position wherein it will envelop the upper portion of a person seated in the vehicle; means for moving the element to and holding it in enveloping position with sufficient security to prevent the enveloped person from being thrown against parts of the vehicle; and inertia-responsive means for controlling operation of the last means.

5. A safety device of the class described comprising a flexible netting; means for supporting the netting in a vehicle body clear of the occupants of the vehicle; and means for actuating the netting to cause the latter to envelop the upper portion of a seated occupant of the vehicle and to hold the occupant from contact with parts of the vehicle likely to cause injury to the occupant.

6. A safety device of the class described comprising a flexible covering element; means for mounting the element in a vehicle for movement from a folded position to a position wherein it will envelop the upper portion of a person seated in the vehicle; and means for moving the element to and holding it in enveloping position with sufficient security to prevent the enveloped person from being thrown against parts of the vehicle, said mounting means including carriages vertically slidable in the side walls of the vehicle body, arms connected to the carriages and to the element, and cables connected to the arms at locations for the arms and carriages to co-act in guiding the element about the person when the cables are actuated.

7. A safety device of the class described comprising a flexible netting; means for mounting the netting in a vehicle body for movement from an inactive position to an active position wherein the netting is adapted to envelop a seated occupant of the vehicle; a spring loaded actuating mechanism for said element; means for operatively connecting the mechanism to the element for movement of the latter to enveloping position upon a release of the spring; means for latching the mechanism with the spring loaded; and means for tripping the latching means to render the spring free to act.

8. A safety device of the class described comprising a flexible netting; means for mounting the netting in a vehicle body for movement from an inactive position to an active position wherein the netting is adapted to envelop a seated occupant of the vehicle; a shaft; pulleys fixed to the shaft; cables trained about the pulleys and connected to said element; a spring operatively connected to said shaft to rotate the latter and cause said pulleys and cables to co-act in moving the netting to enveloping position; means for latching the shaft against rotation with said spring loaded; and means for releasing the latching means to render the spring free to rotate the shaft as aforestated.

9. A safety device of the class described comprising a flexible netting; means for mounting the netting in a vehicle body for movement from an inactive position to an active position wherein the netting is adapted to envelop a seated occupant of the vehicle; a shaft; pulleys fixed to the shaft; cables trained about the pulleys and connected to said element; a spring operatively connected to said shaft to rotate the latter and cause said pulleys and cables to co-act in moving the netting to enveloping position; a detent fixed to the shaft; and an inertia-responsive member having a detent normally co-acting with the shaft detent to latch the shaft against rotation with said spring loaded.

10. A safety device of the class described comprising a flexible netting; means for mounting the netting in a vehicle body for movement from an inactive position to an active position wherein the netting is adapted to envelop a seated occupant of the vehicle; a shaft; pulleys fixed to the shaft; cables trained about the pulleys and connected to said element; a spring operatively connected to said shaft to rotate the latter and cause said pulleys and cables to co-act in moving the netting to enveloping position; a detent fixed to the shaft; a weighted arm having a detent normally co-acting with the shaft detent to latch the shaft against rotation with said spring loaded; and manually operable means connected to said arm for actuating the latter from a remote point on the vehicle.

11. A safety device of the class described comprising a flexible netting; means for supporting the netting in a vehicle body clear of the occupants of the vehicle; means for actuating the netting to cause the latter to envelop a seated occupant of the vehicle and to hold the occupant from contact with parts of the vehicle; and a flexible tie member connected to the netting intermediate the sides of the vehicle body and to the body at a point rearwardly of the netting for reinforcing the latter against forward lunging stresses imposed thereon by an enveloped person.

LEO E. PRYOR.